(12) United States Patent
Hurter

(10) Patent No.: US 10,210,637 B2
(45) Date of Patent: Feb. 19, 2019

(54) CURVE EDITING MECHANISM

(71) Applicant: ECOLE NATIONALE DE L'AVIATION CIVILE, Toulouse (FR)

(72) Inventor: Christophe Hurter, Toulouse (FR)

(73) Assignee: ECOLE NATIONALE DE L'AVIATION CIVILE, Toulouse (FR)

(*) Notice: Subject to any disclaimer, the term of this patent is extended or adjusted under 35 U.S.C. 154(b) by 3 days.

(21) Appl. No.: 15/466,371

(22) Filed: Mar. 22, 2017

(65) Prior Publication Data
US 2017/0278284 A1 Sep. 28, 2017

(30) Foreign Application Priority Data
Mar. 24, 2016 (EP) .................................. 16305337

(51) Int. Cl.
G06T 11/20 (2006.01)
G06F 3/01 (2006.01)
G06F 17/30 (2006.01)

(52) U.S. Cl.
CPC ............ G06T 11/203 (2013.01); G06F 3/011 (2013.01); G06F 17/30572 (2013.01)

(58) Field of Classification Search
CPC ... G06F 3/011; G06F 17/30572; G06T 11/203
See application file for complete search history.

(56) References Cited

U.S. PATENT DOCUMENTS

| 9,589,376 | B2 * | 3/2017 | Hahn | .................... G06T 11/203 |
| 2006/0044311 | A1 | 3/2006 | Dohta | |
| 2010/0194750 | A1 * | 8/2010 | Mielekamp | ............. G06T 19/00 345/424 |

(Continued)

FOREIGN PATENT DOCUMENTS

WO  WO2016202973  *  6/2016  ............... G06T 5/00

OTHER PUBLICATIONS

Apperception—Youtube, Data Visualisation—D3—Network relationship, URL: https://www.youtube.com/watch?v=K35PgDaU64c (Year: 2015).*

(Continued)

*Primary Examiner* — Mark K Zimmerman
*Assistant Examiner* — Phuc N Doan
(74) *Attorney, Agent, or Firm* — Meagher Emanuel Laks Goldberg & Liao, LLP

(57) ABSTRACT

Datasets such as two dimensional raster images or three dimensional voxel based representations are often processed for representation using a transfer function defined by a curve. A mechanism for manually adjusting such curves is described, whereby a user adds a second curve. The transfer curve is recalculated so as to draw closer to the second curve. By drawing the second curve in the shape required for the transfer curve, and repeating this gesture as the transfer curve evolves, the user can subtly and interactively develop the transfer curve until the processed representation is exactly as required. The attractive effect of the points of the first curve on those of adjacent point on the first curve and on those of the second may be attractive or repellent, may vary in any manner as a function of distance, and in particular may imitate the effects of physical forces such as magnetic, elastic, etc.

12 Claims, 9 Drawing Sheets

(56) References Cited

U.S. PATENT DOCUMENTS

| | | | | |
|---|---|---|---|---|
| 2011/0216070 A1* | 9/2011 | Witkin | ............ | G06T 13/40 |
| | | | | 345/442 |
| 2013/0132051 A1* | 5/2013 | Hadap | ............ | G06T 11/203 |
| | | | | 703/6 |
| 2013/0222385 A1* | 8/2013 | Dorsey | ............ | G06T 11/20 |
| | | | | 345/427 |
| 2014/0098142 A1 | 4/2014 | Lee et al. | | |
| 2015/0022522 A1* | 1/2015 | Li | ............ | G06T 19/00 |
| | | | | 345/424 |
| 2015/0340145 A1* | 11/2015 | Hein | ............ | H02K 33/16 |
| | | | | 335/302 |

OTHER PUBLICATIONS

European Search Report for 16305337.4 dated Oct. 4, 2016.
J.M. Zheng et al: "A New Approach for Direct Manipulation of Free-Form Curve", Computer Graphics Forum, vol. 17, No. 3, Aug. 1, 1998 (Aug. 1, 1998), pp. 327-334.
Baudel T: "A Mark-Based Interaction Paradigm for Free-Hand Drawing", Symposium on User Interface Software and Technology, XX, XX, Nov. 2, 1994 (Nov. 2, 1994), pp. 185-192.
Alper Selver et al: "A software tool for interactive generation representation, and systematical storage of transfer functions for 3D medical images", Computer Methods and Programs in Biomedicine, Elsevier, Amsterdam, NL, vol. 86, No. 3, May 3, 2007 (May 3, 2007), pp. 270-280.
Danny Holten et al: "Forced-Directed Edge Bundling for Graphic Visualization", Computer Graphics Forum, vol. 28, No. 3, Jun. 1, 2009 (Jun. 1, 2009), pp. 983-990.

* cited by examiner

CURVE EDITING MECHANISM

FIELD OF THE INVENTION

The present invention relates to the definition of curves, and their use to manipulate data.

BACKGROUND OF THE INVENTION

FIG. 1 shows a histogram representing a dataset.

As shown, the histogram comprises an x axis and two y axes 101 and 102. Arranged along the x axis area series of bars 110, 111, 112, 113, 114, 115, 116, 117.

Histograms such as that shown in FIG. 1 are a common way to represent the content of a dataset, in a variety in different contexts. For example, the data may be a two dimensional image. In this context, the first ordinate axis 101 may represent a number of pixels, and the abscussa may reflect pixel intensity, so that each of the bars represents the number of pixels in the image in a particular intensity range.

Another example may be the representation of a three dimensional volume, for example defined in terms of a collection of voxels, each having a characteristic density or opacity, such that the x axis may reflect voxel density or opacity, so that each of the bars represents the number of voxels in the volume in a particular density or opacity range.

Volumetric datasets are found in many fields, such as engineering, material sciences, medical imaging, astrophysics. The exploration of volumetric datasets is not trivial, and is heavily impacted by the specific needs of users. In most airports for example, security agents deal with such data exploration in the context of baggage inspections. X-ray and tomography are two commonly used fluoroscopic scanning systems. X-ray systems provide a flattened 2D luggage scan while tomography systems produce transversal scans, also called slices. Thanks to data processing techniques such as the Radon transform, these systems can produce a full 3D scan, comprising a set of voxels with corresponding density data. Since the resulting X-ray scanned image only contains voxel or pixel densities, it cannot display the original material colours. The standard colour visual mapping uses three different colours (orange, green, and blue) to display the data density. Orange colour corresponds to low density (mainly organic items). In opposition, blue colour is used for high density values (i.e. metal). In the case of X-ray systems, green colour corresponds to the superposition of different kinds of materials or average density materials.

There are of course countless other applications of representations of this kind.

It is furthermore common to combine representations of the kind shown with a filter function. As shown in FIG. 1, the second Y axis 102 may represent a weighting to be applied to the bars at different positions on the x axis. As shown in FIG. 1, a flat line 120 represents a 100% weighting to all bars equally.

FIG. 2 shows a histogram representing a weighted dataset.

FIG. 2 shows a histogram similar to that of FIG. 1, however in this case the line 220 representing the weighting, filter or transfer function while 100% for bars to the left of the x axis, falls to zero for bars to the right of the x axis. Along the x axis are a series of bars 210, 211, 212, 213, 214, 215, 216, 217, which may be compared to the bars 110, 111, 112, 113, 114, 115, 116, 117 of FIG. 1, where it will be noted that while bars 210, 211, 212 are identical to bars 110, 111, 112, bars 213, 214, 215, 216 and 217 are increasingly attenuated as they approach the right of the x axis, and the filter function 220 falls away to zero.

In some cases, the transfer curve may map the voxel density with a specific colour (including its transparency). The transfer function can be 1, 2 n dimensional and can be of great help to isolate structures of interest in the data. Thanks to the colour blending process, suitable transfer function can also reveal iso surfaces, that is, surfaces that represent points of a constant value, or hide density to improve the data visualization.

It will be appreciated that where a filter is applied to the histogram in this way, a corresponding filter can be applied to the original data, which when displayed in graphical form will exhibit a corresponding shift in appearance. The possibility of imposing subtle shifts in the representation in this way on the basis of the underlying properties of the data (for example density, opacity, intensity, etc.) can be used to highlight or suppress certain parts of the dataset. This may in turn make it easier to interpret the dataset, to identify formations therein, and so on.

It is common to enable a user to manually adjust the transfer curve 220, by direct interaction through a user interface. For example, the curve may be defined as a composite bezier curve, which the user can modify by adding or moving control points.

A drawback of such approaches is that even a small modification to the curve can have a dramatic influence on the histogram and the corresponding representation of the dataset, making this approach generally somewhat clumsy.

Accordingly, it is desired to provide a more subtle and intuitive mechanism for adjusting curves.

SUMMARY OF THE INVENTION

In accordance with a first aspect, there is provided a method of defining a continuous path, comprising the steps of: defining a first path comprising a plurality of points, defining a second path comprising a plurality of points, moving each point on the first path with respect to each points on the second path in a manner analogous to an attractor effect between points on the first path to neighbouring points on the first path, and to respective points on the second path, where the positions of said second path are fixed. This mechanism provides a subtle and incremental mechanism for developing a path as required, with less tendency for overshoot and oscillation around the desired path. As such, the desired path can be achieved more rapidly, with a lower total demand on system resources, and a reduced likelihood of errors.

In a development of the first aspect, the attractive effect between points of the first path and points of the second path differs from the attractive effect between points of the first path and other points of the first path. The variation of attraction mechanisms can provide more intuitive behaviour by mimicking natural effects appropriate to each aspect of the mechanism.

In a further development of the first aspect, the positions of the terminal points of the first path are fixed.

In a further development of the first aspect, the attractive effect diminishes as a function of the distance between the two points.

In a further development of the first aspect, the attractive effect grows as a function of the distance between the two points.

In a further development of the first aspect, the method comprises the further steps of applying said first path to define a transfer function, and filtering a dataset with respect to said transfer function.

In a further development of the first aspect, the second path is defined by a gesture from a user. Providing for the direct definition of the second path by a user gesture further enhances the subtlety and intuitive nature of the mechanism, with still less tendency for overshoot and oscillation around the desired path. As such, the desired path can be achieved more rapidly, with a lower total demand on system resources, and a reduced likelihood of errors.

In a further development of the first aspect, the gesture is input by means of a mouse, pen, tracking movements of the user's body, or tracking a user's eye movement. Use of these familiar input mechanisms for the capture of user gestures still further enhances the subtlety and intuitive nature of the mechanism, with still less tendency for overshoot and oscillation around the desired path. As such, the desired path can be achieved more rapidly, with a lower total demand on system resources, and a reduced likelihood of errors.

In a further development of the first aspect, the attractive effect is negative in nature. Providing a "push" type effect further enhances the subtlety and intuitive nature of the mechanism, with still less tendency for overshoot and oscillation around the desired path. As such, the desired path can be achieved more rapidly, with a lower total demand on system resources, and a reduced likelihood of errors.

In a further development of the first aspect there are defined a plurality of types of second line, each associated with a different attractive effect, and the method comprises the further steps of receiving a user input specifying one of said plurality of types of second line, and whereby at said step of moving each point on first path with respects to points on second path, determining each said movement as a function of the attractive effect associated with the selected line type. Enabling different types of interaction, such as "push" and "pull", further enhances the subtlety and intuitive nature of the mechanism, with still less tendency for overshoot and oscillation around the desired path. As such, the desired path can be achieved more rapidly, with a lower total demand on system resources, and a reduced likelihood of errors.

In a further development of the first aspect, the first path or the second path is defined by a composite Bezier, where the points on the line may correspond to the vertices of the composite Bezier.

In a further development of the first aspect, the steps of defining a second path and moving each point on said first path are repeated iteratively. A repetitive or iterative interaction makes it possible for the user to "sketch" the desired shape, still further enhancing the subtlety and intuitive nature of the mechanism, with still less tendency for overshoot and oscillation around the desired path. As such, the desired path can be achieved more rapidly, with a lower total demand on system resources, and a reduced likelihood of errors.

In accordance with a second aspect there is provided an apparatus adapted to implement the method of the first aspect.

In accordance with a third aspect there is provided an apparatus for defining a continuous path, adapted to define a first path comprising a plurality of points, to define a second path comprising a plurality of points, and to move each point on said first path with respect to each point on the second path in a manner analogous to an attractive effect between points on said first path to neighbouring points on said first path and to respective said points on said second path, where the positions of said second path are fixed. In accordance with a fourth aspect, there is provided a computer program adapted to implement the steps of the first aspect.

BRIEF DESCRIPTION OF THE DRAWINGS

The above and other advantages of the present invention will now be described with reference to the accompanying drawings, in which.

DETAILED DESCRIPTION

Figure 1:
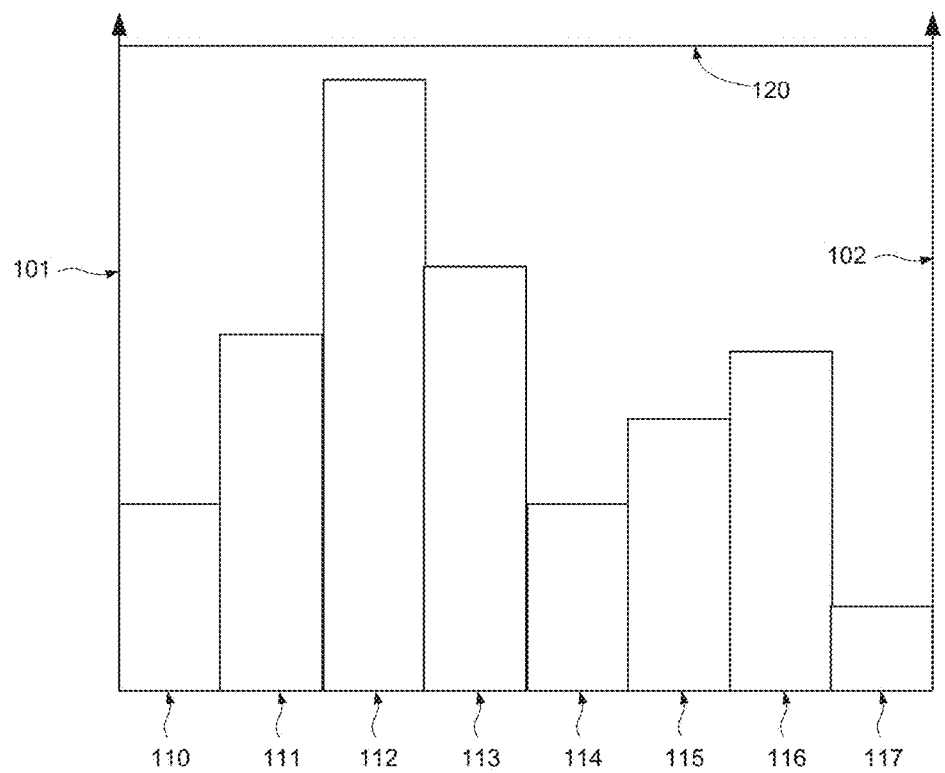
FIG. 1 shows a histogram representing a dataset.
Figure 2:
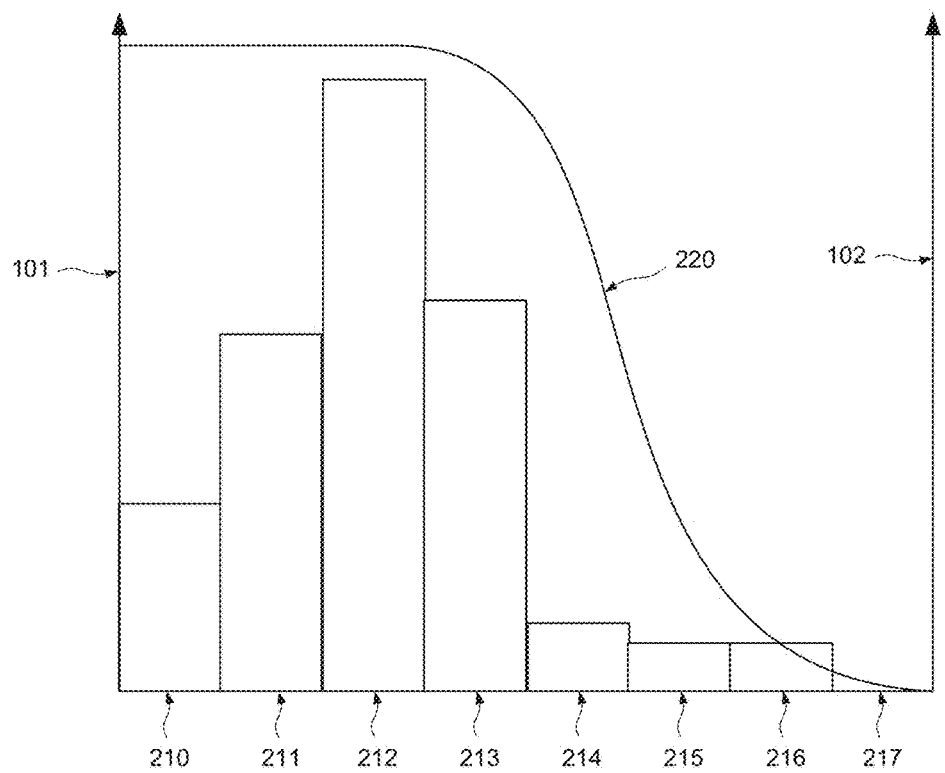
FIG. 2 shows a histogram representing a weighted dataset.
Figure 3:
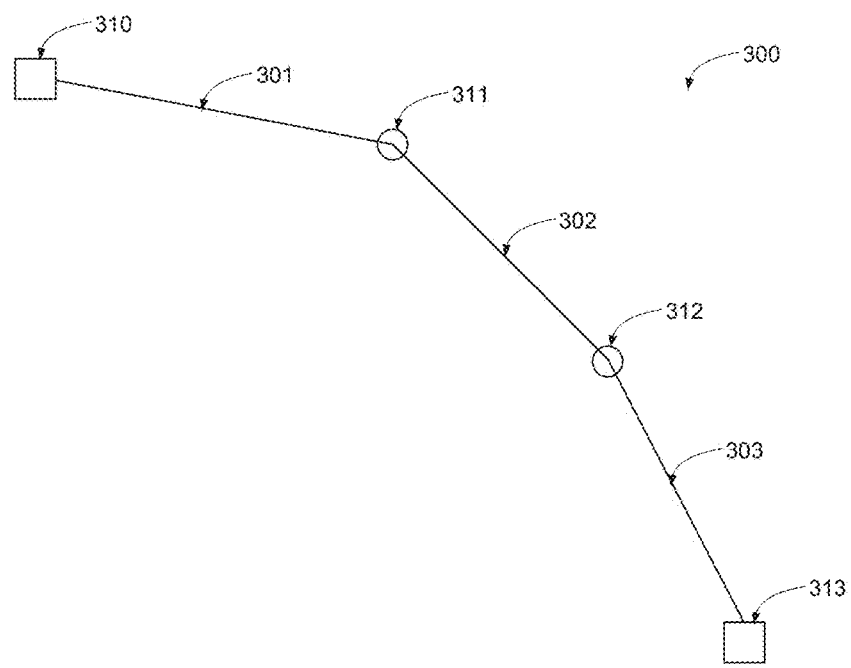
FIG. 3 shows a curve to which embodiments may be applied.

FIG. 3 shows a curve to which embodiments may be applied. As shown in FIG. 3 there is provided a curve 300, defined by three straight sections 301, 302, 303. Sections 301 and 302 intersect at point 311, and sections 302 and 303 intersect at point 312. Section 301 terminates at anchor point 310, and section 303 terminates at anchor point 313, so that the curve 300 itself also terminates at anchor points 310 and 313. This curve may represent a transfer curve as described above.

Figure 4:
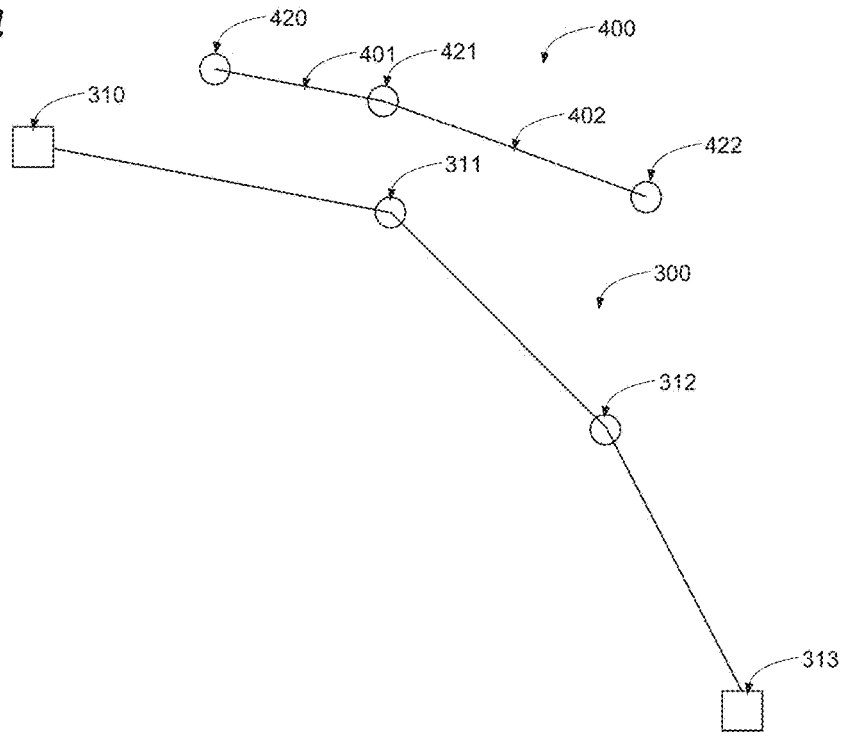
FIG. 4 shows a set of curves in accordance with an embodiment.

FIG. 4 shows a set of curves in accordance with an embodiment. As shown in FIG. 4 there is provided a curve 300 as described above, and a further curve 400 defined by two straight sections 401, 402. Sections 401 and 402 intersect at point 421. Section 401 terminates at point 420, and section 402 terminates at point 422, so that the curve 400 itself also terminates at anchor points 420 and 422. In accordance with embodiments as described hereafter, this second curve 400 may be the result of a user interaction. This second curve 400 is provided as a means for influencing the first curve 300.

Figure 5:
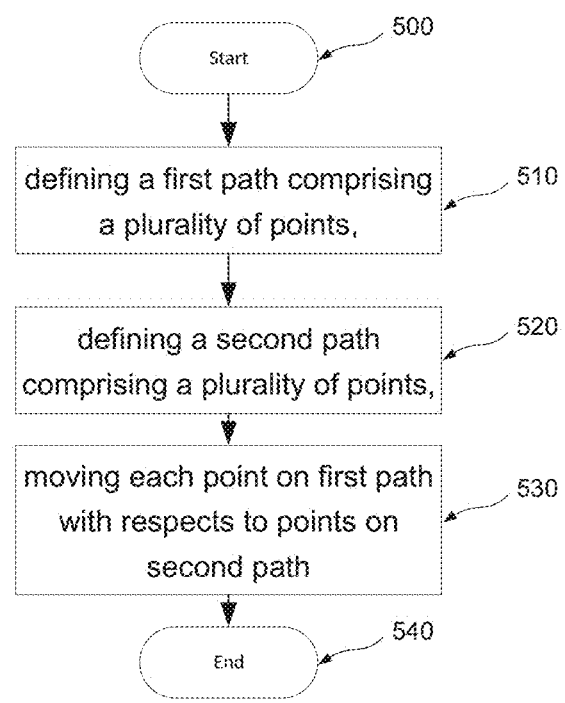
FIG. 5 shows the steps of a method in accordance with an embodiment.

FIG. 5 shows the steps of a method in accordance with an embodiment.

More particularly, FIG. 5 shows the steps of a method of defining a continuous path. As shown, the method starts at step 500 before proceeding to step 510, at which a first path comprising a plurality of points is defined. This first path may correspond for example to the curve 300 of FIG. 3. The method then proceeds to steps 520 at which a second path comprising a plurality of points is defined. This second path may correspond for example to the curve 400 of FIG. 4. Finally, the method proceeds to step 530 at which each point on said first path is moved towards respective points on the second path in a manner analogous to an attractive force, said movement being limited in a manner analogous to an elastic connection between the particles of said first path, where the positions of said second path are fixed, before terminating at step 540.

Figure 6:
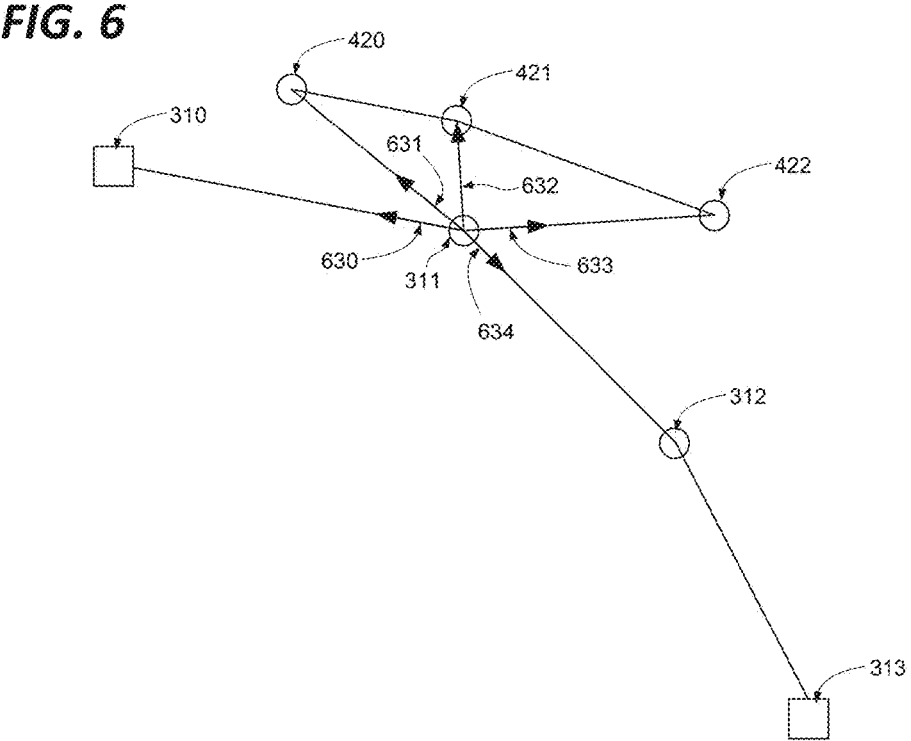
FIG. 6 illustrates step 530 of the method of FIG. 5.

FIG. 6 illustrates step 530 of the method of FIG. 5.

FIG. 6 shows a first path 300 and second path 400 as described above with reference to FIGS. 3, 4 and 5. In FIG. 6, the movement at step 530 of the point 311 will be considered. As shown, the three points on the second path 420, 421, 422 are each considered to exert an attraction the point 311, represented by the arrows 631, 632, 633. Meanwhile, the adjacent points 310 and 312 on the first path 300 are considered to be attached to the point 311 by an elastic restraint, such that any deflection of the point 311 towards the second path in response to the attraction it exerts will be resisted by an opposing attraction, represented by the lines 630, 634. As shown in FIG. 6, the terminal points 310, 313 are assumed to be fixed in position.

Figure 7:
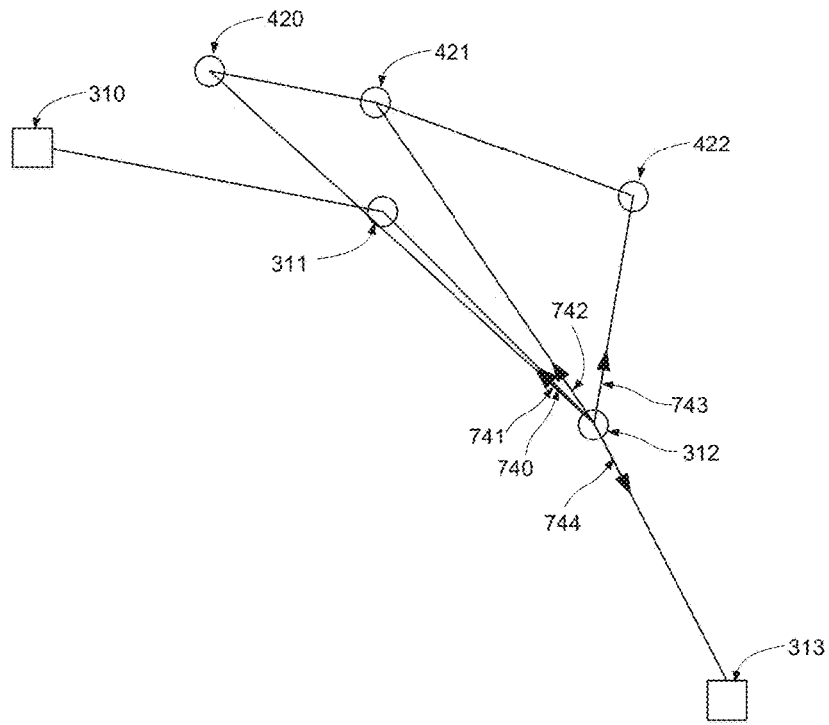
FIG. 7 further illustrates step 530 of the method of FIG. 5.

FIG. 7 further illustrates step 530 of the method of FIG. 5.

FIG. 7 shows a first path 300 and second path 400 as described above with reference to FIGS. 3, 4 and 5. In FIG. 7, the movement at step 530 of the point 312 will be considered. As shown, the three points on the second path 420, 421, 422 are each considered to exert an attraction the point 312, represented by the arrows 741, 742, 743. Meanwhile, the adjacent points 311 and 313 on the first path 300 are considered to be attached to the point 312 by an elastic restraint, such that any deflection of the point 312 towards the second path in response to the attraction it exerts will be resisted by an opposing attraction, represented by the lines 740, 744. As shown in FIG. 7, the terminal points 310, 313 are assumed to be fixed in position.

While the first path 300 as described above only has two mobile points, it will be appreciated that the same considerations may be applied to a path having any number of points. Furthermore, it will be appreciated that any movement of a point on the first path will modify the direction and magnitude of the attractions experienced by other points in the first path, so that it will be necessary to resolve all of the attractions simultaneously.

Figure 8:
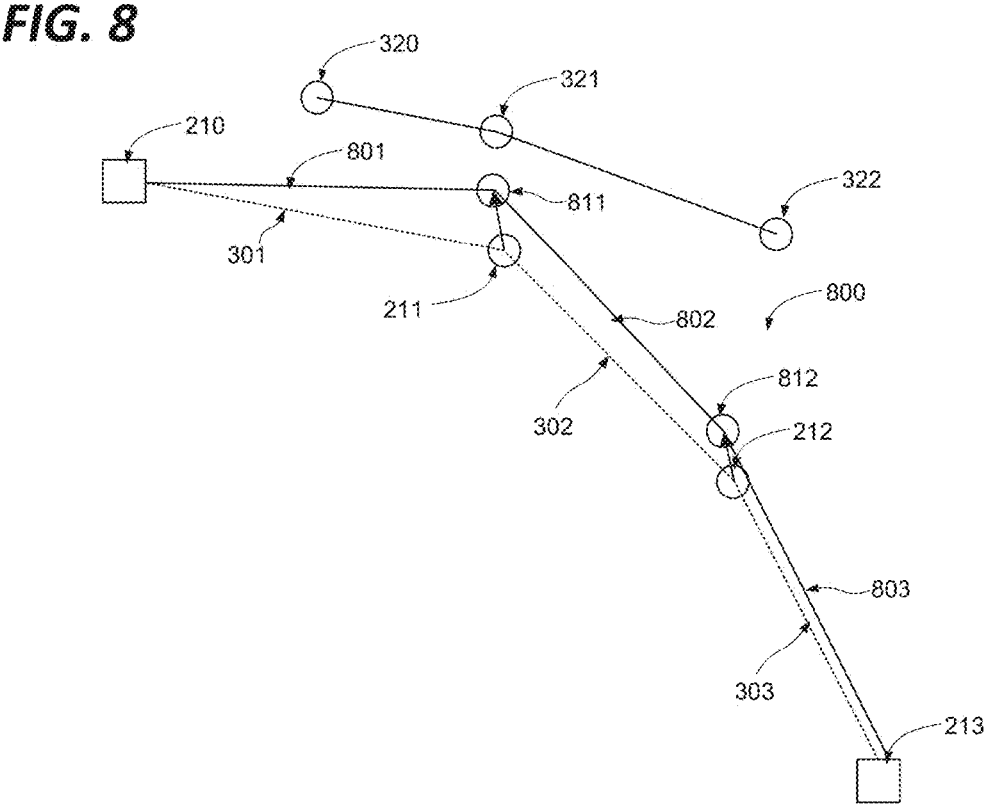
FIG. 8 shows the adjusted first curve combining the effects of FIGS. 6 and 7.

FIG. 8 shows the adjusted first curve combining the effects of FIGS. 6 and 7.

As shown, there is provided an adjusted first curve 800, defined by points 210, 811, 812, 213, joined by lines 801, 802, 803. As such, the point 211 has been moved under the influence of the attraction of points 320, 321, 322 to the position of 811, and the point 212 has been moved under the influence of the attraction of points 320, 321, 322 to the position of 812. Points 210 and 213 are fixed and as such have not moved.

The attractive force between points of the first path and points of the second may be modelled as diminishing as a function of the distance between two points concerned.

Still further, the attractive force between points of the first path and points of the second may be modelled as being inversely proportional to the square of the distance between two points concerned.

Still further, the attractive force between points of the first path and points of the second may be modelled as being analogous to a magnetic or gravitational attraction.

The resistive force between adjacent points of the first path may be modelled as being proportional to the increase in distance between the respective points.

Still further, the attractive force between points of the first path and points of the second may be modelled as being analogous to an elastic resistance.

The first path as described above may be used as the transfer curve for application to a dataset as described above.

The second path may be defined by a user input. This user input may be in the form of a gesture. This user input may be provided by means of a touch pad, mouse, digital pen or stylus, touch sensitive display, motion controller, eye tracker or any other suitable input system.

The first path need not be displayed to the user.

The second path need not be displayed to the user.

In certain embodiments, once the first path has been adjusted to reflect the influence of the second path, the second path itself may no longer be required, and the new positions of the points 311, 312 may simply be defined. Alternatively, the path may continue to be defined in terms of a set of balanced forces, which will generally be susceptible to simplification, for example by defining the equivalent attraction to one or more predefined points required to achieve the same result.

Figure 9:
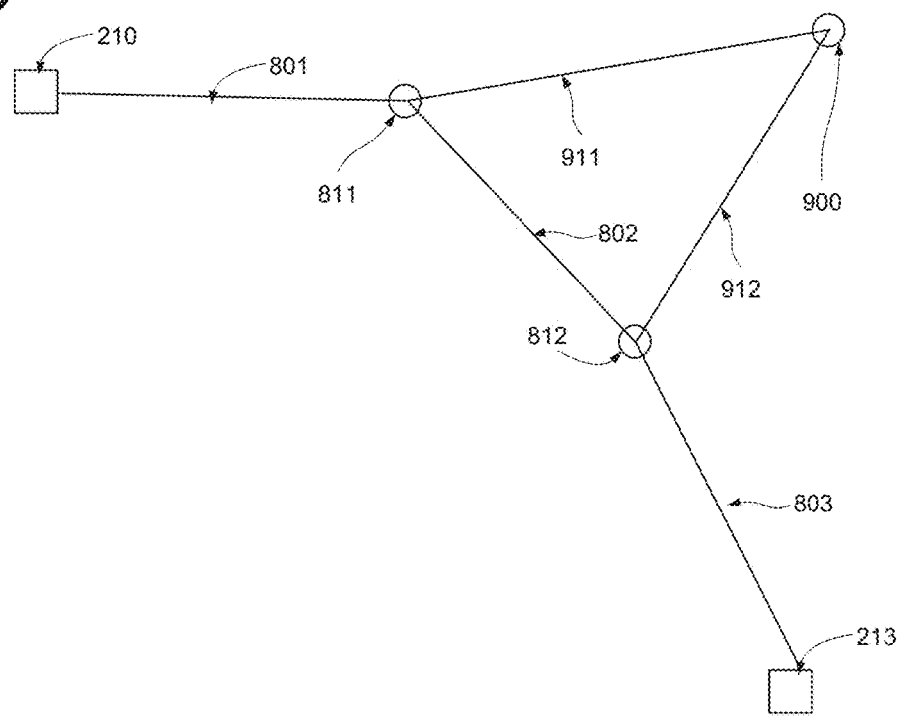
FIG. 9 shows a simplified dynamic path definition.

FIG. 9 shows a simplified dynamic path definition.

As shown in FIG. 9 the attractive effect of points 320, 321 and 322 has been replaced with the attractive effect 911, which together with the resistive behaviour of the lines 801, 802, 803 causes the point 811 to assume the same position as it did under the influence of the points 320, 321, 322 as shown in FIG. 8. Similarly, the attractive effect of points 320, 321 and 322 has been replaced with the attractive effect 912, which together with the resistive behaviour of the lines 801, 802, 803 causes the point 812 to assume the same position as it did under the influence of the points 320, 321, 322 as shown in FIG. 8.

Further paths having an effect corresponding to that of the second path described above may be added successively. In combination with the behaviours described above, the user may thus incrementally draw the first path in a desired direction by repeatedly drawing the same second path—each time the second path is redrawn, it's attractive influence is applied to the first path in a similar way, so that it is incrementally pulled closer to the second path. It will be appreciated that minor variations between iterations of the second path will be averaged out across iterations, so that a very subtle and intuitive mechanism is provided.

Since the first path may be used as a transfer curve defining a transfer function for use in filtering a colour/intensity histogram for example as described above, this approach affords a particularly refined mechanism for user interactions with the transfer function.

By drawing the second path on one side of the first path or the other, the user may pull the first path back and forth, providing a mechanism for correcting excessive effects.

It will be appreciated that many different types of attractive effect may be envisaged. The attraction may be negative (i.e. repulsive) in nature. It may be greater as a function of distance, rather than inversely related as described above. The relationship between attractive effect and distance may be dictated by any function as required.

In certain embodiments, there may be provided a plurality of types of second line, each type having a characteristic type of attractive effect, chosen for example from the possibilities outlined above. By this means the user may select from a palette of different drawing tools, each of which will affect the first path to a different degree, or in accordance with a different principle.

Thus, the in accordance with the process of FIG. 5 there may be defined a plurality of types of second line, each associated with a different attractive effect, and the process may comprise the further steps of receiving a user input specifying one of the plurality of types of second line, and at said step of moving each point on first path with respects to points on second path, determining each movement as a function of the attractive effect associated with the selected line type.

While for the sake of simplicity the curve has been presented as a series of straight lines approximating a smooth curve, it will be appreciated that the described approach extends to any convenient manner of defining a line. In particular, the curve may be defined by a composite Bezier where the points on the line may correspond to the vertices of the composite Bezier. Alternatively, the curve may correspond to a bitmap representation of the curve, where each point is a pixel, and the attractive force of each pixel is weighted according to the level of shading after interpolation.

Accordingly, datasets such as two dimensional raster images or three dimensional voxel based representations are often processed for representation using a transfer function defined by a curve. In accordance with certain embodiments, there is provided a mechanism for manually adjusting such curves, whereby a user adds a second curve. The transfer curve is recalculated so as to draw closer to the second curve. By drawing the second curve in the shape required for the transfer curve, and repeating this gesture as the transfer curve evolves, the user can subtly and interactively develop the transfer curve until the processed representation is exactly as required. The attractive effect of the points of the first curve on those of adjacent points on the first curve and on those of the second may be attractive or repellent, may vary in any manner as a function of distance, and in particular may imitate the effects of physical forces such as magnetic, elastic, etc.

The disclosed methods can take form of an entirely hardware embodiment (e.g.FPGA), an entirely software embodiment (for example to control a system according to the invention) or an embodiment containing both hardware and software elements. As such, embodiments may comprise a number of subsystems, functional elements or means adapted to implement the invention in communication with each other, and/or with standard fixed function or programmable elements for example as described below.

Software embodiments include but are not limited to applications, firmware, resident software, microcode, etc. The invention can take the form of a computer program product accessible from a computer-usable or computer-readable medium providing program code for use by or in connection with a computer or an instruction execution system.

A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

In some embodiments, the methods and processes described herein may be implemented in whole or part by a user device. These methods and processes may be implemented by computer-application programs or services, an application-programming interface (API), a library, and/or other computer-program product, or any combination of such entities.

The user device may be a mobile device such as a smart phone or tablet, a drone, a computer or any other device with processing capability, such as a robot or other connected device.

In accordance with certain embodiments, in order to browse between a collection of datasets susceptible of graphical representation, these datasets are associated with points on a sliding scale of one, two or three dimensions. When a point corresponding to a particular dataset is selected by a user via a mouse pointer or the like, it is rendered as a graphical representation and presented to the user. When an intermediate point is selected, an interpolation of the datasets corresponding to the nearby points is generated and the resulting dataset rendered as a graphical representation and presented to the user. The interaction may be implemented with a slider bar type widget having hybrid behaviour such that clicking on the bar causes the button to jump to the nearest point corresponding to a data, while sliding to a chosen intermediate position activates the interpolation of adjacent datasets.

Figure 10:
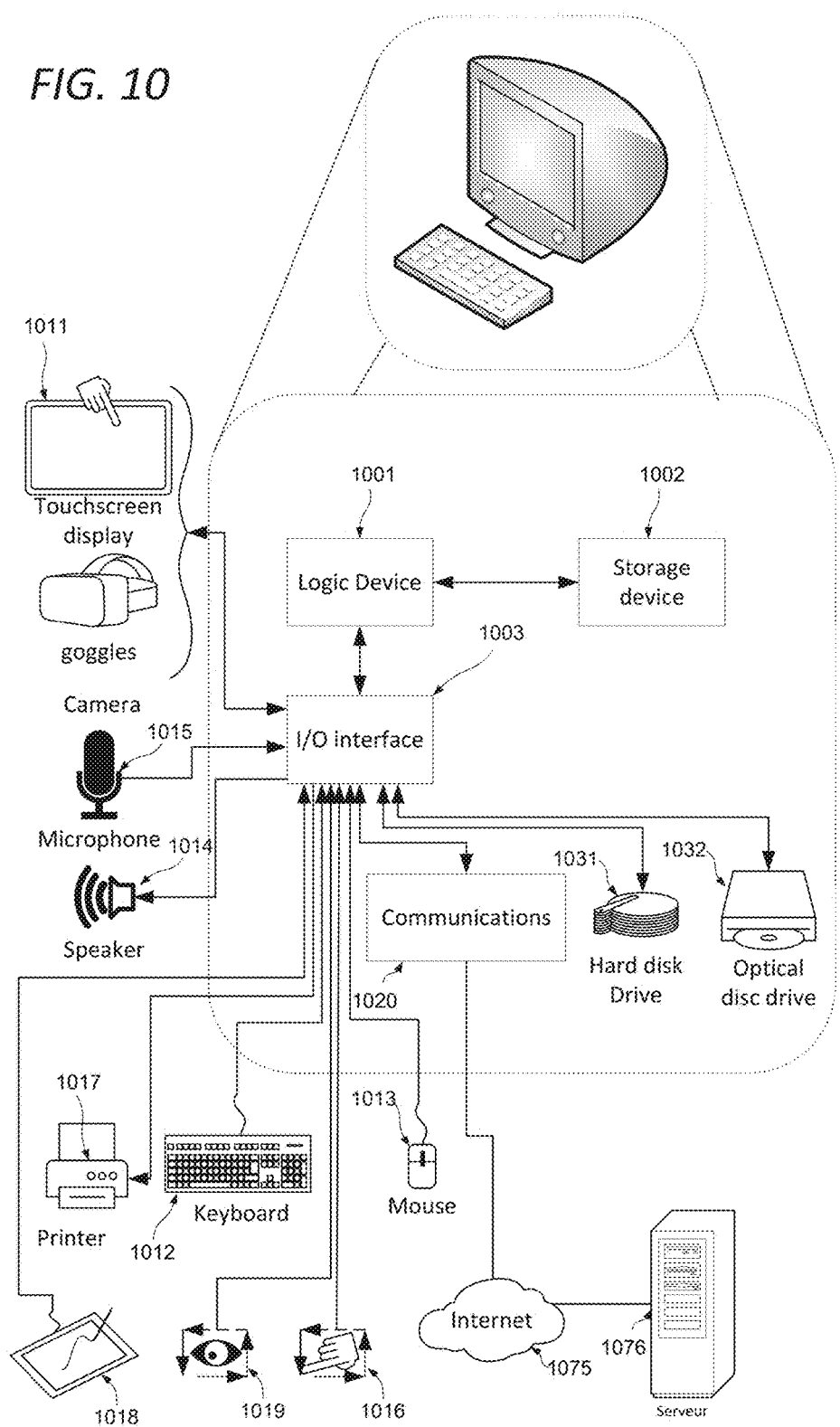
FIG. 10 shows a generic computing system suitable for implementation of embodiments of the invention.

FIG. 10 shows a generic computing system suitable for implementation of embodiments of the invention.

A shown in FIG. 10, a system includes a logic device 1001 and a storage device 1002. The system may optionally include a display subsystem 1011, input/output subsystem 1003, communication subsystem 1020, and/or other components not shown.

Logic device 1001 includes one or more physical devices configured to execute instructions. For example, the logic device 1001 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device 1001 may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device 1001 optionally may be distributed among two or more separate devices, which may be remotely located and/or configured for coordinated processing. Aspects of the logic device 1001 may be virtualized and executed by remotely accessible, networked computing devices configured in a cloud-computing configuration.

Storage device 1002 includes one or more physical devices configured to hold instructions executable by the logic device to implement the methods and processes described herein. When such methods and processes are implemented, the state of storage 1002 device may be transformed—e.g., to hold different data.

Storage device 1002 may include removable and/or built-in devices. Storage device 602 may comprise one or more types of storage device including optical memory (e.g., CD, DVD, HD-DVD, Blu-Ray Disc, etc.), semiconductor memory (e.g., FLASH, RAM, EPROM, EEPROM, etc.), and/or magnetic memory (e.g., hard-disk drive, floppy-disk drive, tape drive, MRAM, etc.), among others. Storage device may include volatile, nonvolatile, dynamic, static, read/write, read-only, random-access, sequential-access, location-addressable, file-addressable, and/or content-addressable devices.

In certain arrangements, the system may comprise an interface 1003 adapted to support communications between the Logic device 1001 and further system components. For example, additional system components may comprise removable and/or built-in extended storage devices. Extended storage devices may comprise one or more types of storage device including optical memory 1032 (e.g., CD, DVD, HD-DVD, Blu-Ray Disc, etc.), semiconductor memory 1033 (e.g., RAM, EPROM, EEPROM, FLASH etc.), and/or magnetic memory 1031 (e.g., hard-disk drive, floppy-disk drive, tape drive, MRAM, etc.), among others. Such extended storage device may include volatile, non-volatile, dynamic, static, read/write, read-only, random-access, sequential-access, location-addressable, file-addressable, and/or content-addressable devices.

It will be appreciated that storage device includes one or more physical devices, and excludes propagating signals per se. However, aspects of the instructions described herein alternatively may be propagated by a communication medium (e.g., an electromagnetic signal, an optical signal, etc.), as opposed to being stored on a storage device.

Aspects of logic device 1001 and storage device 1002 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system implemented to perform a particular function. In some cases, a program may be instantiated via logic device executing machine-readable instructions held by storage device. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

In particular, the system of FIG. 10 may be used to implement embodiments of the invention.

For example a program implementing the steps described with respect to FIG. 5 may be stored in storage device 1002 and executed by logic device 1001. Data used for the creation of the graphical representation with reference to the transfer function may be stored in storage 1002 or the extended storage devices 1032 or 1031 and the display 1011 used to display the graphical representation. The first and second curves may be presented on the display 1011, and the second curve may be defined by means of the mouse 1013, touchpad or touchscreen 1011, digital pen or graphics tablet 1018, or motion controller 1016, etc.

In some cases, the computing system may comprise or be in communication with a scanner or other three dimensional imaging system as described above. This communication may be achieved by wired or wireless network, serial bus, firewire, Thunderbolt, SCSI or any other communications means as desired. In such cases, a program for the control of the scanner and/or the retrieval of data therefrom may run concurrently on the logic device 1001, or these features may be implemented in the same program as implementing the steps described with respect to FIG. 5.

Accordingly the invention may be embodied in the form of a computer program.

Furthermore, when suitably configured and connected, the elements of FIG. 10 may constitute an apparatus adapted to generate a graphical representation of a dataset, and cause a display device to display said representation; this apparatus may further be adapted to receive data from an eye tracking system indicating a point of regard. The apparatus may comprise storage for compiling a record of the point of regard over a duration, and the apparatus may further be adapted to modify the graphical representation to indicate the proportion of the duration for which said point of regard was directed at each point in said representation. This point of regard may then be assimilated to the selected point and/or the cursor as described above.

It will be appreciated that a "service", as used herein, is an application program executable across multiple user sessions. A service may be available to one or more system components, programs, and/or other services. In some implementations, a service may run on one or more server-computing devices.

When included, display subsystem 1011 may be used to present a visual representation of data held by a storage device. This visual representation may take the form of a graphical user interface (GUI). As the herein described methods and processes change the data held by the storage device 1002, and thus transform the state of the storage device 1002, the state of display subsystem 1011 may likewise be transformed to visually represent changes in the underlying data. Display subsystem 1011 may include one or more display devices utilizing virtually any type of technology for example as discussed above. Such display devices may be combined with logic device and/or storage device in a shared enclosure, or such display devices may be peripheral display devices.

When included, input subsystem may comprise or interface with one or more user-input devices such as a keyboard 1012, mouse 1011, touch screen 1011, graphics tablet, digital pen 1018, eyetracking system 1019, motion controller 1016 or game controller (not shown). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, colour, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1020 may be configured to communicatively couple computing system with one or more other computing devices. For example, communication module of may communicatively couple computing device to remote service hosted for example on a remote server 1076 via a network of any size including for example a personal area network, local area network, wide area network, or internet. Communication subsystem may include wired and/or wireless communication devices compatible with one or more different communication protocols. As non-limiting examples, the communication subsystem may be configured for communication via a wireless telephone network 1074, or a wired or wireless local- or wide-area network. In some embodiments, the communication subsystem may allow computing system to send and/or receive messages to and/or from other devices via a network such as Internet 1075. The communications subsystem may additionally support short range inductive communications with passive devices (NFC, RFID etc).

Figure 11:
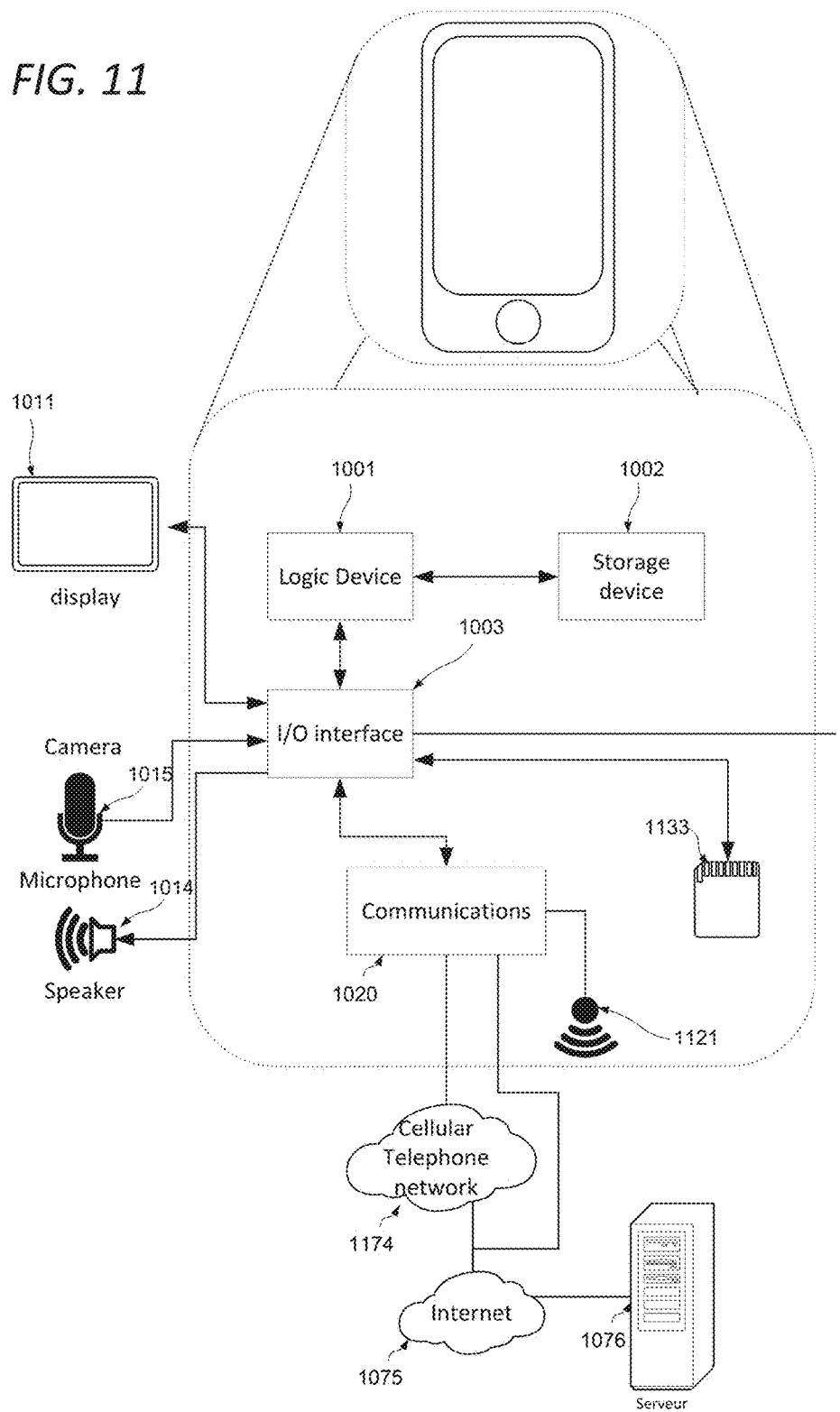
FIG. 11 shows a smartphone device adaptable to constitute an embodiment.
Figure 12:
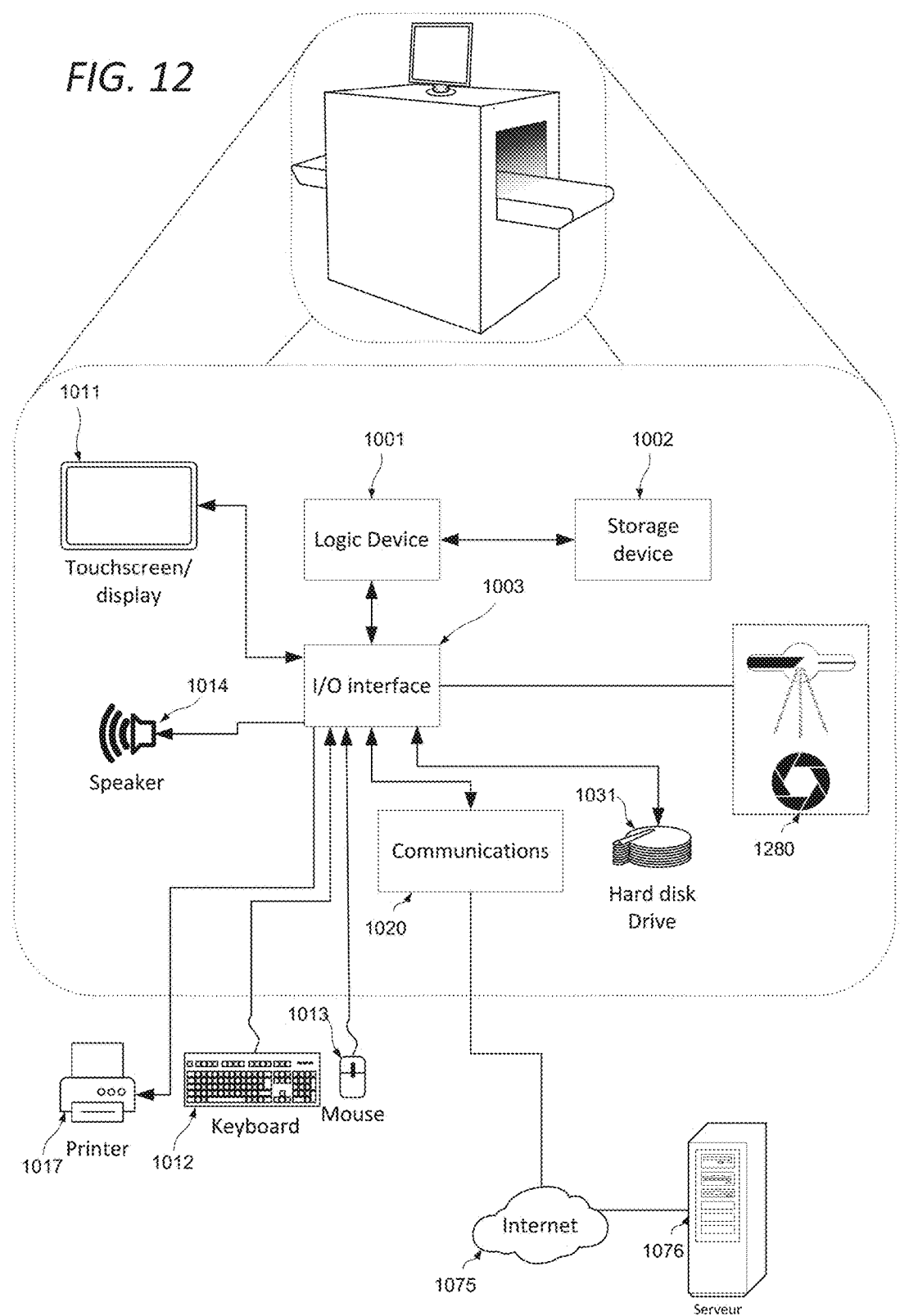
FIG. 12 shows an object scanner system adaptable to constitute an embodiment.
Figure 13:
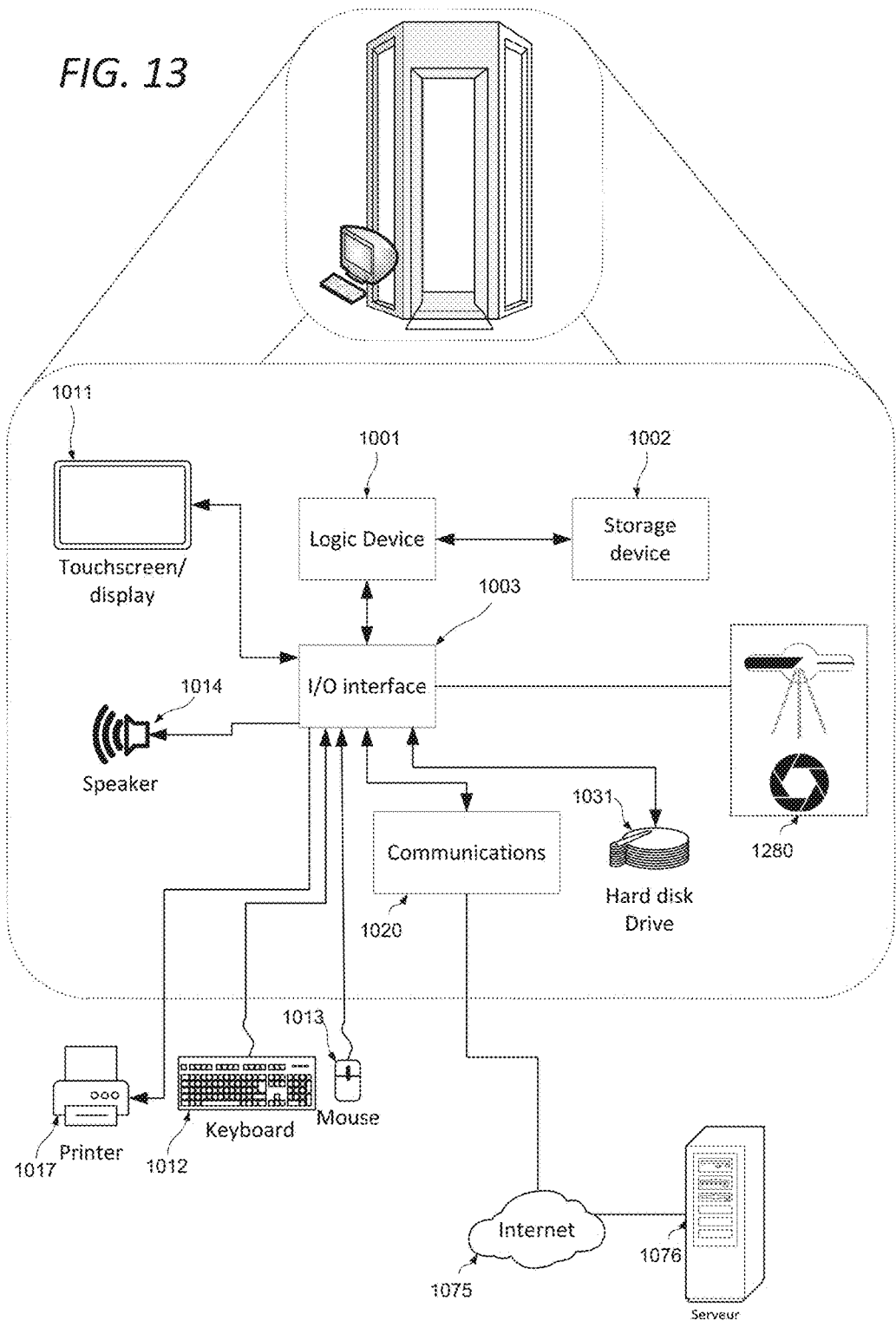
FIG. 13 shows a body scanner system adaptable to constitute an embodiment.

The system of FIG. 10 is intended to reflect a broad range of different types of information handling system. It will be appreciated that many of the subsystems and features described with respect to FIG. 10 are not required for implementation of the invention, but are included to reflect possible systems in accordance with the present invention. It will be appreciated that system architectures vary widely, and the relationship between the different sub-systems of FIG. 10 is merely schematic, and is likely to vary in terms of layout and the distribution of roles in systems. It will be appreciated that, in practice, systems are likely to incorporate different subsets of the various features and subsystems described with respect to FIG. 10. FIGS. 11, 12 and 13 disclose further example devices in accordance with the present invention. Those of ordinary skill in the art will appreciate that systems may be employed in the future which also operate in accordance with the present invention.

FIG. 11 shows a smartphone device adaptable to constitute an embodiment. As shown in FIG. 11, the smartphone device incorporates elements 1001, 1002, 1003, 1020, near field communications interface 1121, flash memory 1133, 1014, 1015, and 1011 as described above. It is in communication with the telephone network 1174 and a server 1076 via the network 1075. Alternative communication mechanisms such as a dedicated network or WiFi may also be used. The device may also be in communication with the scanner device when included. The features disclosed in this figure may also be included within a tablet device as well.

FIG. 12 shows an object scanner system adaptable to constitute an embodiment. This is representative of the devices used in airports, train stations and the like for scanning baggage and other articles for concealed weapons or contraband. As shown in FIG. 12, object scanner system comprises elements 1001, 1002, 1003, 1020, 1031, 1012, 1013, 1014, and 1017 as described above. It may be in communication with a server 1076 via the network 1075. Alternative communication mechanisms such as a dedicated network or WiFi may also be used. The device is also in communication with the scanner hardware 1280.

FIG. 13 shows a body scanner system adaptable to constitute an embodiment. This is representative of the devices used in airports, train stations and the like for scanning individuals for concealed weapons or contraband. As shown in FIG. 13, object scanner system comprises elements 1001, 1002, 1003, 1020, 1031, 1012, 1013, 1014, and 1017 as described above. It may be in communication with a server 1076 via the network 1075. Alternative communication mechanisms such as a dedicated network or WiFi may also be used. The device is also in communication with the scanner hardware 1280.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of defining a continuous path performed by an apparatus having one or more processors, said method comprising:
defining a first path comprising a plurality of points,
receiving user input defining a gesture by means of a mouse, pen, tracking movements of the user's body, or tracking a user's eye movement,
defining a second path comprising a plurality of points on the basis of said gesture,
displaying said first path,
displaying said second path,
moving each point on said first path as displayed with respect to each point on the second path in a manner analogous to an attractive effect between points on said first path to neighbouring points on said first path and to respective said points on said second path, where the positions of said second path are fixed.

2. The method of claim 1 wherein the attractive effect between points of the first path and points of the second path differ from the attractive effect between points of the first path and other points of the first path.

3. The method of claim 1 wherein the positions of the terminal points of said first path are fixed.

4. The method of claim 3 wherein said attractive effect diminishes as a function of the distance between two points.

5. The method of claim 3 wherein said attractive effect grows as a function of the distance between two points.

6. The method of claim 1 further comprising applying said first path to define a transfer function, and filtering a dataset with respect to said transfer function.

7. The method of claim 1 wherein said attractive effect is negative in nature.

8. The method of claim 7 wherein there are defined a plurality of types of second line, each associated with a different attractive effect, said method comprising the further steps of receiving a user input specifying one of said plurality of types of second line, and whereby at said step of moving each point on first path with respects to points on second path, determining each said movement as a function of the attractive effect associated with the selected line type.

9. The method of claim 1 wherein said first path or said second path is defined by a composite Bezier, where the points on the line may correspond to the vertices of the composite Bezier.

10. The method of claim 1 where said defining a second path and moving each point on said first path are repeated iteratively.

11. An apparatus for defining a continuous path, said apparatus comprising one or more processors and at least one memory wherein the one or more processors is configured to:
receive user input defining a gesture by means of a mouse, pen, tracking movements of the user's body, or tracking a user's eye movement,
define a first path comprising a plurality of points,
define a second path comprising a plurality of points on the basis of said gesture,
display said first path, display said second path, and
move each point on said first path as displayed with respect to each point on the second path in a manner analogous to an attractive effect between points on said first path to neighbouring points on said first path and to respective said points on said second path, where the positions of said second path are fixed.

12. A computer program product comprising computing instructions stored on a non-transitory computer medium for defining a continuous path, wherein the computing instructions when executed by one or more processors perform the method of:

defining a first path comprising a plurality of points, receiving user input defining a gesture by means of a mouse, pen, tracking movements of the user's body, or tracking a user's eve movement, defining a second path comprising a plurality of points on the basis of said gesture, displaying said first path, displaying said second path, moving each point on said first path as displayed with respect to each point on the second path in a manner analogous to an attractive effect between points on said first path to neighbouring points on said first path and to respective said points on said second path, where the positions of said second path are fixed.

\* \* \* \* \*